(12) United States Patent
Kelley et al.

(10) Patent No.: US 6,763,465 B1
(45) Date of Patent: Jul. 13, 2004

(54) METHOD OF ENSURING THAT THE PC IS NOT USED TO MAKE UNAUTHORIZED AND SURREPTITIOUS TELEPHONE CALLS

(75) Inventors: Edward E. Kelley, Wappingers Falls, NY (US); George P. Sammons, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,850

(22) Filed: Nov. 23, 1999

(51) Int. Cl.[7] ............................................... H04L 9/00
(52) U.S. Cl. ..................... 713/200; 713/201; 380/257
(58) Field of Search .............................. 713/202, 201, 713/200; 709/203, 216; 380/257

(56) References Cited

U.S. PATENT DOCUMENTS

| | | | |
|---|---|---|---|
| 4,905,281 A | | 2/1990 | Surjaatmadja et al. |
| 5,535,261 A | | 7/1996 | Brown et al. |
| 5,606,604 A | | 2/1997 | Rosenblatt et al. |
| 5,631,907 A | * | 5/1997 | Guarneri et al. ............ 370/474 |
| 5,638,513 A | * | 6/1997 | Ananda ...................... 713/202 |
| 5,790,636 A | | 8/1998 | Marshall |
| 5,933,498 A | * | 8/1999 | Schneck et al. ............... 705/54 |
| 5,940,843 A | * | 8/1999 | Zucknovich et al. ....... 715/516 |
| 6,134,591 A | * | 10/2000 | Nickles ...................... 709/229 |
| 6,247,052 B1 | * | 6/2001 | Huang et al. ............... 709/224 |
| 6,389,542 B1 | * | 5/2002 | Flyntz ........................ 713/201 |

* cited by examiner

*Primary Examiner*—Gilberto Barrón
*Assistant Examiner*—K Zand
(74) *Attorney, Agent, or Firm*—DeLio & Peterson, LLC; Peter W. Peterson; James J. Cioffi

(57) ABSTRACT

The present invention prevents unauthorized access and modifications to programs and non-executable files, particularly a dialer program, stored on a personal computer system (PC) by providing a protected storage area on a hard drive of the PC wherein access to the protected storage area is controlled by the owner/user of the PC. Attempts to add, remove, or modify any of the programs and non-executable files in the protected storage area will result in an interrupt prompting the user to supply a valid password or other acknowledgement. A preferred embodiment includes a protected memory area as a part of the computer's internal random access memory (RAM) such that upon initialization of a program, the program and non-executable files are copied into the protected memory area from the protected storage area. The protected memory area may also be password protected to provide additional safeguards against unauthorized access. Also disclosed is a method and apparatus for creating and utilizing a program storage table and a program function table for controlling access and modifications of programs and non-executable files, particularly a dialer program, stored in the protected storage area. Preferably, the present invention may be embodied as a computer program product stored on a program storage device.

18 Claims, 6 Drawing Sheets

PROGRAM STORAGE TABLE

| Program Name | Program Location |
|---|---|
| 1st program name | 1st program location |
| 2nd program name | 2nd program location |

FIG. 6

PROGRAM FUNCTION TABLE

| Program Name | Hardware | Function |
|---|---|---|
| 1st program name e.g. dialer program | 1st program hardware e.g. modem | 1st program function e.g. writiing phone no. to modem |
| 2nd program name | 2nd program hardware | 2nd program function |

FIG. 7

METHOD OF ENSURING THAT THE PC IS NOT USED TO MAKE UNAUTHORIZED AND SURREPTITIOUS TELEPHONE CALLS

BACKGROUND OF THE INVENTION

1. Field of the Invention

This invention provides a method and apparatus for preventing unauthorized access to programs and non-executable files stored on a personal computer, in particular, dialer programs, such that rogue programs installed on the personal computer by someone other than the owner/user are disabled when executed.

2. Description of Related Art

Today's personal computer (PC) systems typically include a modem and corresponding software, such as a dialer program, so that the PC may access other computers or a telephone via the telephone line. Typically, upon initializing the modem by selecting the dialer program or a related program, the user is notified when a call is being made by the PC. However, this notification may be disabled without the PC user's consent or knowledge. When the modem has made an active connection to another computer, information may be exchanged with the other computer. Unauthorized access to the PC may be gained through the modem and rogue programs may be installed on the PC without the user's knowledge or active participation. A rogue dialer program surreptitiously installed on the PC may not only disable any notification to the user that the PC is dialing out but may also surreptitiously dial out when the computer is turned on. This may result in extremely high telephone charges for the unsuspecting PC owner. Thus, it would be highly desirable to find a way to prevent unauthorized access to the PC and, in addition, disable rogue programs which may have been surreptitiously installed on the PC.

Bearing in mind the problems and deficiencies of the prior art, it is therefore an object of the present invention to provide a method and apparatus of preventing unauthorized access to a PC.

It is another object of the present invention to provide a method and apparatus for disabling programs installed on a PC without the owner/user's authorization and knowledge.

A further object of the invention is to provide a method and apparatus for ensuring the PC is not used to make surreptitious telephone calls.

It is yet another object of the present invention to provide a method and apparatus for disabling a rogue dialer program from making surreptitious telephone calls via the PC.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of protecting a dialer program on a personal computer from unauthorized access comprising the steps of: (a) creating a protected storage area on the personal computer; (b) installing the dialer program on the personal computer in the protected storage area; and (c) preventing modifications to the dialer program when unauthorized access to the dialer program is detected.

Preferably, the method of protecting a dialer program on a personal computer from unauthorized access further includes the steps of: (i) detecting access to the dialer program; (ii) requesting a password when access to the dialer program is detected; and (iii) validating the password prior to allowing a modification to the dialer program. Preferably, the method may further include the step of creating a protected memory area on the personal computer wherein the dialer program is loaded into the protected memory area from the protected storage area when the dialer program is initialized. The method may further include the step of creating a program storage table comprising entries of programs stored in the protected storage area and during step (b) an entry may be created for the dialer program in the program storage table. Preferably, during step (b) a dialer program without an entry in the program storage table may be disabled when engaged. During step (c), preferably, a user of the personal computer is notified when unauthorized access to the dialer program is detected.

In another aspect, the present invention is directed to a method of controlling a dialer program on a personal computer comprising the steps of: (a) creating a protected storage area on the personal computer; (b) storing the dialer program in the protected storage area; (c) requesting an acknowledgement when a modification to the dialer program is initiated; and (d) preventing access to the dialer program when the acknowledgement is invalid. The method may further include the step of .

Preferably, the method further includes the steps of validating the acknowledgement; the step of creating a protected memory area on the personal computer wherein the dialer program is loaded into the protected memory area when the dialer program is initialized; and the step of creating a program storage table comprising entries of programs which are stored in the protected storage area. After step (b), the step of creating an entry in the program storage table for the dialer program may be further included.

The step of creating a program function table comprising entries for each program stored in the protected storage area may also be included in the present method. Each entry in the program function table may comprise a program function for each program stored in the protected storage area. Thus, preferably, after step (b), the step of creating an entry in the program function table for the dialer program is included.

In another aspect, the present invention is directed to a method of protecting a dialer program on a personal computer from unauthorized access, the personal computer having a protected storage area and a program storage table comprising the steps of: (a) installing and storing the dialer program in the protected storage area; (b) creating an entry for the dialer program in the program storage table; detecting any attempts to modify the dialer program; (c) determining whether the dialer program has an entry in the program storage table when an attempt to modify the dialer program is detected; (d) requesting an acknowledgement when an attempt to modify the dialer program having an entry in the program storage table is detected; (e) preventing modification of the dialer program when an invalid acknowledgement is received; and (f) allowing modification of the dialer program when a valid acknowledgment has been received.

Preferably, the method may further include the step of creating a program function table wherein only programs having an entry in the program function table may be loaded into a random access memory of the personal computer; the step of disabling any programs which do not have an entry in the program function table; the step of creating an entry for the dialer program in the program function table; and the step of determining whether the dialer program has an entry in the program function table such that upon initializing the dialer program, the dialer program is loaded onto a protected memory area of the personal computer.

Preferably, step (e) comprises requesting a password when an attempt to modify the dialer program having an entry in the program storage table is detected. Most preferably, step (e) further includes validating the acknowledgement when an acknowledgement is received.

In still another aspect, the present invention is directed to a method of ensuring that a personal computer is not used to make surreptitious telephone calls comprising the steps of: (a) storing a dialer program in a protected storage area on the personal computer; (b) providing a program storage table; (c) creating an entry for the dialer program in the program storage table; (d) providing a program function table; (e) creating an entry comprising a dialing function for the dialer program in the program function table wherein the personal computer may only use the dialer program to dial; and (f) disabling other dialer programs installed on the personal computer outside of the protected storage area having no entries in the program storage table and the program function table.

Preferably, step (b) comprises providing a program storage table for monitoring programs stored in the protected storage area. Preferably, step (d) comprises providing a program function table for monitoring functions of programs stored in the protected storage area having entries in the program storage table wherein only those functions entered in the program function table are executable.

The method may further include the step of requesting an acknowledgement when an attempt to modify the dialer program stored in the protected storage area is detected; the step of denying access to the dialer program when the acknowledgement is invalid; the step of providing access to the dialer program when the acknowledgement is valid; the step of notifying a user of the personal computer when the other dialer programs are installed on the personal computer outside of the protected storage area; and the step of providing a protected memory area wherein the dialer program is copied into the protected memory area from the protected storage area when the dialer program is initialized.

In still another aspect, the present invention is directed to a method of preventing a dialer program from being installed on a personal computer having an existing dialer program comprising the steps of: (a) providing a protected storage area in the personal computer; (b) providing a protected memory area on the personal computer; (c) storing the existing dialer program in a protected storage area of the personal computer; (d) loading the dialer program into the protected memory area when the dialer program is initialized; (e) providing a program storage table and creating an entry for the existing dialer program in the program storage table such that access to the existing dialer program is provided only upon receipt of a valid password; (f) providing a program function table and creating an entry for the existing dialer program in the program function table such that only those functions listed in the program function table are executable by the personal computer; (g) preventing access to the program storage table, the program function table and the existing dialer program without receipt of a valid password; and (h) disabling an other dialer program when the other dialer program is installed and initialized on the personal computer.

In still yet another aspect, the present invention is directed to a method of installing a dialer program on a personal computer wherein the dialer program is protected from unauthorized access comprising the steps of: (a) installing the dialer program in a protected storage area of the personal computer; (b) entering an identifier for the dialer program in a program storage table wherein those programs stored in the protected storage area are entered in the program storage table requiring a valid acknowledgement prior to modification of the programs; and (c) entering a function for the dialer program in a program function table wherein only those programs entered in the program function table may execute a program function.

In still yet another aspect, the present invention is directed to a method of creating and utilizing a program storage table on a personal computer comprising the steps of: (a) providing a protected storage area on the personal computer; (b) installing programs in the protected storage area; (c) creating a program storage table comprising entries for each program stored in the protected storage area; (d) requesting an acknowledgement when a modification to the programs in the protected storage area having an entry in the program storage table is detected; (e) preventing modification of the programs in the protected storage area having an entry in the program storage table when an invalid acknowledgement is received; and (f) allowing modification of the programs in the protected storage area having an entry in the program storage table when a valid acknowledgement is received.

Preferably, step (b) comprises installing a dialer program in the protected storage area, wherein during step (c) an entry for the dialer program is entered into the program storage table, wherein step (d) comprises requesting a password when a modification to the dialer program is detected, and wherein step (e) comprises preventing modification of the dialer program when the password is invalid.

In still yet another aspect, the present invention is directed to a method of creating and utilizing a program function table on a personal computer comprising the steps of: (a) providing a protected storage area on the personal computer; (b) installing programs in the protected storage area; (c) creating a program function table comprising entries for each program stored in the protected storage area, each entry comprising a function of each program stored in the protected storage area; (d) creating an entry for the programs installed in the protected storage area in the program function table; (e) determining whether an entry exists in the program function table when a program is initialized; (f) disabling the initialized program when the initialized program has no entry in the program function table; and (g) executing the initialized program when the initialized program has an entry in the program function table.

Preferably, step (b) comprises installing a dialer program in the protected storage area; step (d) comprises creating an entry for the dialer program in the program function table, the entry comprising a dialer function; and wherein upon initialization of the dialer program, an entry in the program function table for the dialer program allows the dialer function to be executed. Preferably, during step (g) executable files of the initialized program is copied from the protected storage area to a random access memory of the personal computer.

In still yet another aspect, the present invention is directed to a program storage device readable by a machine, tangibly embodying a program of instructions executable by the machine to perform method steps for protecting a dialer program from unauthorized access, the method steps comprising: (a) providing a protected storage area; (b) storing the dialer program in the protected storage area; (c) providing a protected memory area wherein the dialer program is loaded into the protected memory area when the dialer program is initialized; (d) providing a means for controlling access to the protected storage area; (e) permitting access to the protected storage area only when a valid acknowledgement is received; and (f) preventing modifications to the dialer program when unauthorized access is detected.

In a further aspect, the present invention is directed to a program storage device readable by a machine, tangibly embodying a program of instructions executable by the machine to perform method steps for protecting a dialer program from unauthorized access, the method steps comprising: (a) providing a protected storage area; (b) providing a protected storage table comprising entries for programs stored in the protected storage area; (c) storing the dialer program in the protected storage area; (d) storing an entry for the dialer program in the program storage table; (e) detecting modifications to the dialer program; (f) determining whether the dialer program, has an entry in the program storage table when an attempt to modify the dialer program is detected; (g) requesting an acknowledgement when an entry in the program storage table exists for the dialer program; (h) preventing modification of the dialer program when an invalid acknowledgement is received; and (i) allowing modification of the dialer program when a valid acknowledgement is received.

In a further aspect, the present invention is directed to a program storage device readable by a machine, tangibly embodying a program of instructions executable by the machine to perform method steps for ensuring that a personal computer is not used to make surreptitious telephone calls, the method comprising the steps of: (a) storing a dialer program in a protected storage area; (b) providing a program storage table; (c) creating an entry for the dialer program in the program storage table; (d) providing a program function table; (e) creating an entry for the dialer program in the program function table wherein only the dialer program may be utilized by the personal computer to dial; and (f) disabling other dialer programs not installed in the protected storage area having no entries in the program storage table and the program function table.

In still a further aspect, the present invention is directed to a program storage device readable by a machine, tangibly embodying a program of instructions executable by the machine to perform method steps for preventing a dialer program from being installed on a personal computer having an existing dialer program, the method comprising the steps of: (a) providing a protected storage area; (b) storing the existing dialer program in the protected storage area; (c) providing a program storage table and creating an entry for the existing dialer program in the program storage table such that access to the existing dialer program is provided only upon receipt of a valid password; (d) providing a program function table and creating an entry for the existing dialer program in the program function table such that only those functions listed in the program function table are executable by the personal computer; (e) preventing access to the program storage table, the program function table and the existing dialer program without receipt of a valid password; and (f) disabling an other dialer program when the other dialer program is installed and initialized on the personal computer.

In still yet a further aspect, the present invention is directed to a program storage device readable by a machine, tangibly embodying a program of instructions executable by the machine to perform method steps for creating an utilizing a program storage table, the method comprising: (a) providing a protected storage area; (b) installing programs in the protected storage area; (c) creating a program storage table comprising entries for each program stored in the protected storage area; (d) requesting an acknowledgement when a modification to the programs in the protected storage area is detected; (e) preventing modification of the programs in the protected storage area when an invalid acknowledgement is received; and (f) allowing modification of the programs in the protected storage area when a valid acknowledgement is received.

In still yet a further aspect, the present invention is directed to a program storage device readable by a machine, tangibly embodying a program of instructions executable by the machine to perform method steps for creating and utilizing a program function table, the method comprising: (a) providing a protected storage area; (b) installing programs in the protected storage area; (c) creating a program function table comprising entries for each program stored in the protected storage area, each entry further including a function of each program stored in the protected storage area; (d) creating an entry for the programs installed in the protected storage area in the program function table; (e) determining whether an entry exists in the program function table when a program is initialized; (f) disabling the initialized program when the initialized program has no entry in the program function table.

In yet a further aspect, the present invention is directed to a computer program product comprising a computer usable medium having computer readable program code means embodied therein for protecting a dialer program from unauthorized access, the computer program product having: computer readable program code means for causing a computer to create a protected storage area; computer readable program code means for causing the computer to create a protected memory area; computer readable program code means for causing the computer to store the dialer program in the protected storage area; computer readable code means for causing the computer to load the dialer program into the protected memory area when the dialer program is initialized; and computer readable program code means for causing the computer to prevent modifications to the dialer program when unauthorized access to the dialer program is detected.

In yet a further aspect, the present invention is directed to a computer program product comprising a computer usable medium having computer readable program code means embodied therein for controlling a dialer program, the computer program product having: computer readable program code means for causing a computer to create a protected storage area; computer readable program code means for causing the computer to store the dialer program in the protected storage area; computer readable program code means for causing the computer to create a protected memory area; computer readable code means for causing the computer to load the dialer program into the protected memory area when the dialer program is initialized; computer readable program code means for causing the computer to request an acknowledgement when a modification to the dialer program is initiated; and computer readable program code means for causing the computer to prevent access to the dialer program when the acknowledgement is invalid.

In yet another aspect, the present invention is directed to a computer program product comprising a computer usable medium having computer readable program code means embodied therein for protecting a dialer program from unauthorized access, the computer program product having: computer readable program code means for causing a computer to create a protected storage area; computer readable program code means for causing the computer to create a protected memory area wherein upon initialization of the dialer program, the dialer program is loaded into the protected memory area; computer readable program code means for causing the computer to create a program storage table; computer readable program code means for causing the computer to create an entry for the dialer program in the program storage table; computer readable program code means for causing the computer to detect any attempts to modify the dialer program; computer readable program code means for causing the computer to determine whether the dialer program has an entry in the program storage table when an attempt to modify the dialer program in detected; computer readable program code means for causing the computer to request an acknowledgement; computer readable program code means for causing the computer to prevent modification of the dialer program when an invalid acknowledgement is received; and computer readable program code means for causing the computer to allow modification of the dialer program when a valid acknowledgement is received.

In yet another aspect, the present invention is directed to a computer program product comprising: a computer usable medium having computer readable program code means embodied therein for ensuring that a personal computer is not used to make surreptitious telephone calls, the computer program product having: computer readable program code means for causing a computer to store a dialer program in a protected storage area on the personal computer; computer readable program code means for causing the computer to copy the dialer program into a protected memory area from the protected storage area; computer readable program code means for causing the computer to provide a program storage table; computer readable program code means for causing the computer to create an entry for the dialer program in the program storage table; computer readable program code means for causing the computer to provide a program function table; computer readable program code means for causing the computer to create an entry comprising a dialer function for the dialer program wherein only the dialer program may be used to dial; and computer readable program code means for causing the computer to disable other dialer programs not installed in the protected storage area without entries in the program storage table and the program function table.

In yet a further aspect, the present invention is directed to a computer program product comprising: a computer usable medium having computer readable program code means embodied therein for preventing a dialer program from being installer on a personal computer having an existing dialer program, the computer program product having: computer readable program code means for causing a computer to provide a protected storage area; computer readable program code means for causing the computer to store the existing dialer program in the protected storage area; computer readable program code means for causing the computer to provide a program storage table and create an entry for the existing dialer program in the program storage table such that access to the existing dialer program is provided only upon receipt of a valid password; computer readable program code means for causing the computer to provide a program function table and create an entry for the existing dialer program in the program function table such that only those functions listed in the program function table are executable; computer readable program code means for causing the computer to prevent access to the program storage table, the program function table and the existing dialer program without receipt of a valid password; and computer readable program code means for causing the computer to disable an other dialer program when the other dialer program is installed and initialized on the personal computer.

In yet a further aspect, the present invention is directed to a computer program product comprising: a computer usable medium having computer readable program code means embodied therein for creating and utilizing a program storage table, the computer program product having: computer readable program code means for causing a computer to provide a protected storage area; computer readable program code means for causing the computer to store programs in the protected storage area; computer readable program code means for causing the computer to create a program storage table comprising entries for each program stored in the protected storage area; computer readable program code means for causing the computer to detect any attempts to modify the programs in the protected storage area having an entry in the program storage table; computer readable program code means for causing the computer to request an acknowledgement when a modification to the programs in the protected storage area having an entry in the program storage table is detected; computer readable program code means for causing the computer to validate the acknowledgement; computer readable program code means for causing the computer to prevent modification of the programs in the protected storage area having an entry in the program storage table when an invalid acknowledgement is received; computer readable program code means for causing the computer to allow modification of the programs in the protected storage area having an entry in the program storage table when a valid acknowledgement is received.

In a final aspect, the present invention is directed to a computer program product comprising: a computer usable medium having computer readable program code means embodied therein for creating and utilizing a program function table, the computer program product having: computer readable program code means for causing a computer to provide a protected storage area; computer readable program code means for causing the computer to store programs in the protected storage area; computer readable program code means for causing the computer to create a program function table comprising entries for each program stored in the protected storage area, each entry comprising a function of each program stored in the protected storage area; computer readable program code means for causing the computer to create an entry for the programs stored in the protected storage area in the program function table; computer readable program code means for causing the computer to determine whether an entry exists in the program function table when a program is initialized; computer readable program code means for causing the computer to disable a program that is initialized when the program has no entry in the program function table; and computer readable program code means for causing the computer to execute a program that is initialized when the program has an entry in the program function table.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 6 is an illustration of a program storage table of the present invention.

FIG. 7 is an illustration of a program function table of the present invention.

DESCRIPTION OF THE PREFERRED EMBODIMENT(S)

Figure 1:
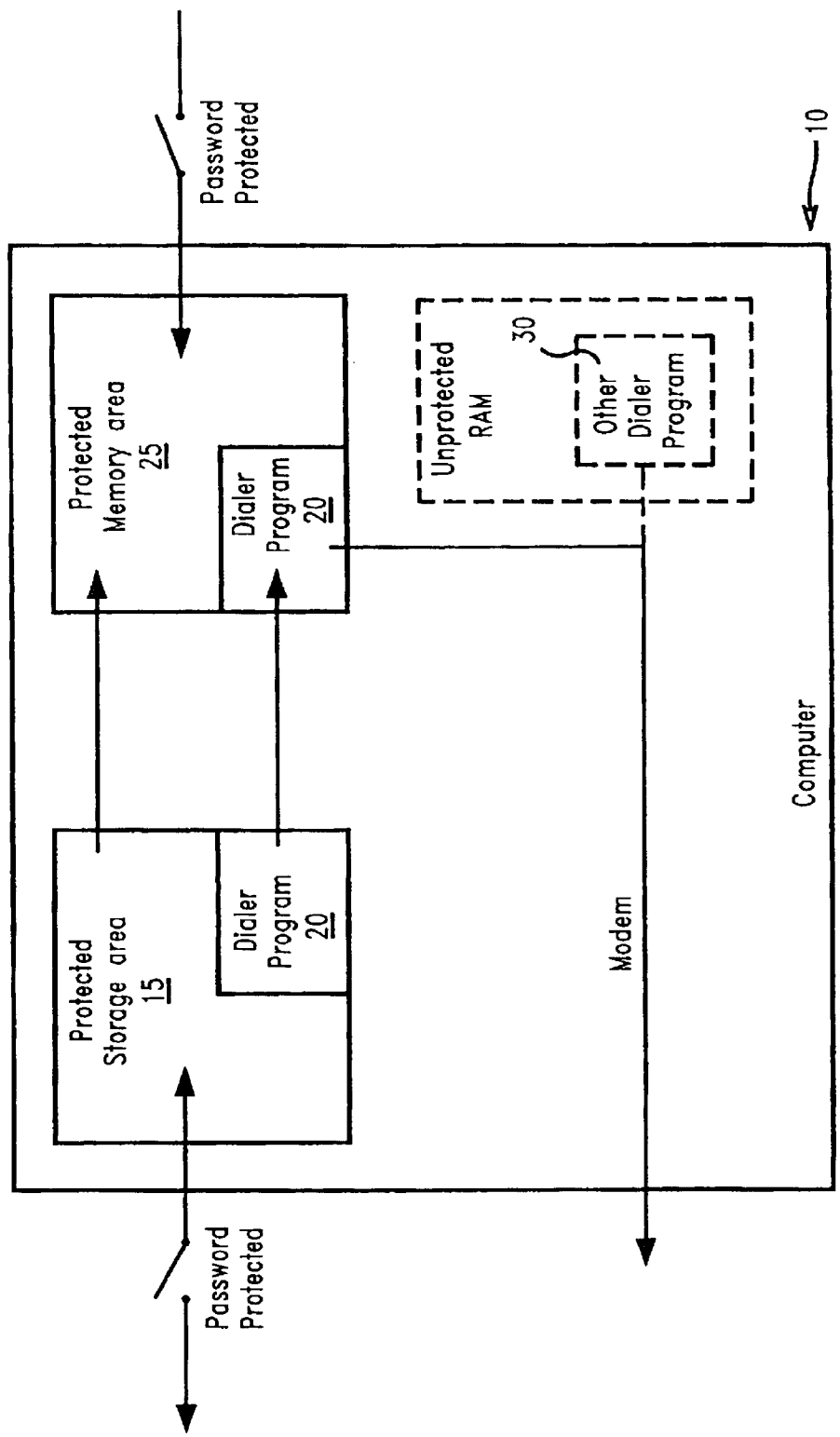
FIG. 1 is a schematic representation of a personal computer system utilizing a method and apparatus of the present invention.

In describing the preferred embodiment of the present invention, reference will be made herein to FIGS. 1–7 of the drawings in which like numerals refer to like features of the invention. Features of the invention are not necessarily shown to scale in the drawings.

The present invention prevents unauthorized access and modifications to programs and non-executable files, particularly a dialer program, stored on a personal computer system (PC) by providing a protected storage area on a hard drive of the PC wherein access to the protected storage area is controlled by the owner/user of the PC. By placing selected programs and non-executable files into the protected storage area, any attempt to add, remove, or modify any of the programs and non-executable files in the protected storage area will result in an interrupt prompting the user to supply a valid password or other acknowledgement. A preferred embodiment includes a protected memory area as a part of the computer's internal random access memory (RAM). Upon initializing a program, the program and non-executable files are copied into the protected memory area from the protected storage area. The protected memory area may also be password protected to provide additional safeguards against unauthorized access. Furthermore, the present invention provides a method and apparatus for creating and utilizing a program storage table and a program function table for controlling access and modifications of programs and non-executable files, particularly a dialer program, stored in the protected storage area. In accordance with the present invention, programs impermissibly installed on the PC are not executed. The present invention may be embodied as a computer program product stored on a program storage device. The program storage devices of the present invention may be devised, made and used as a component of a machine utilizing optics, magnetic properties and/or electronics to perform the method steps of the present invention. Program storage devices include, but are not limited to, magnetic diskettes, magnetic tapes, optical disks, Read Only Memory (ROM), floppy disks, semiconductor chips and the like.

FIG. 1 is a schematic representation of a PC utilizing a method and apparatus of the present invention. Created within computer 10 is a protected storage area 15 recognized by the operating system of the PC. The protected storage area 15 is a directory on the hard drive of the PC and is known by name to the operating system. Any attempts to erase, modify or add programs or non-executable files to this directory will cause the operating system to prompt the user with an interrupt in the form of either an acknowledgement or request for a password to perform an erase, modify or addition of a new program or non-executable file to this storage area.

When an operating system does an initial program load, the contents of the protected storage area are copied into the computer's internal random access memory (RAM) a portion of which may be designated as protected memory area 25. The operating system will access the programs or non-executable files in the protected memory area 25 to execute any of the programs or non-executable files stored therein from the protected storage area 15. Again, any attempts to erase, modify or add to the programs and non-executable files in the protected memory area will cause the operating system to prompt the user with an acknowledgement or request a password to make changes to those programs and non-executable files. The protected memory area 25 provides additional safeguards to unauthorized access of programs and non-executable files and is not required in practicing the current invention.

Dialer program 20 is installed in computer 10 and stored in protected storage area 15. When initialized and loaded into protected memory area 15, dialer program 20 runs a modem connected or installed in computer 10. Upon initialization of dialer program 20, the modem dials out to access another computer system via a telephone line. When any program and non-executable file, such as dialer program 20, is initially installed in the protected storage area, the present invention provides a "set characteristics" program which provides a means for monitoring specific input/output (I/O) operations of the PC. As part of the "set characteristics" program, the present invention provides a program storage table and a program function table. The program storage table, as illustrated in FIG. 6, contains entries for each program and non-executable file stored in protected storage area 15 comprising the program name and the storage location. Only those programs contained in the protected storage table may be loaded into the protected memory area 25 from the protected storage area 15. The "program load" function of the operating system will check every program and non-executable file being loaded into the protected memory area to determine if the program and non-executable file has an entry in the program storage table. An attempt to load a program and non-executable file from another hard drive location will be disabled and canceled. Computer 10 may also include an other dialer program 30 in an unprotected RAM area.

The program function table of the present invention, illustrated in FIG. 7, defines the hardware interface and the I/O operations monitored by the operating system and the programs which are allowed to perform the function specified using the corresponding hardware listed in the program function table. When a program is initialized to perform a function, the present invention provides a means for checking the program function table to see if the program, the required hardware, and the function are entered in the table and correspond to each other. Only when the program has an entry in the program function table does the operating system allow the program to run. Initializing programs requiring specified hardware without an entry in the program function table will be disabled thereby preventing rogue programs which control certain hardware from being executed without the user's knowledge.

Figure 2:
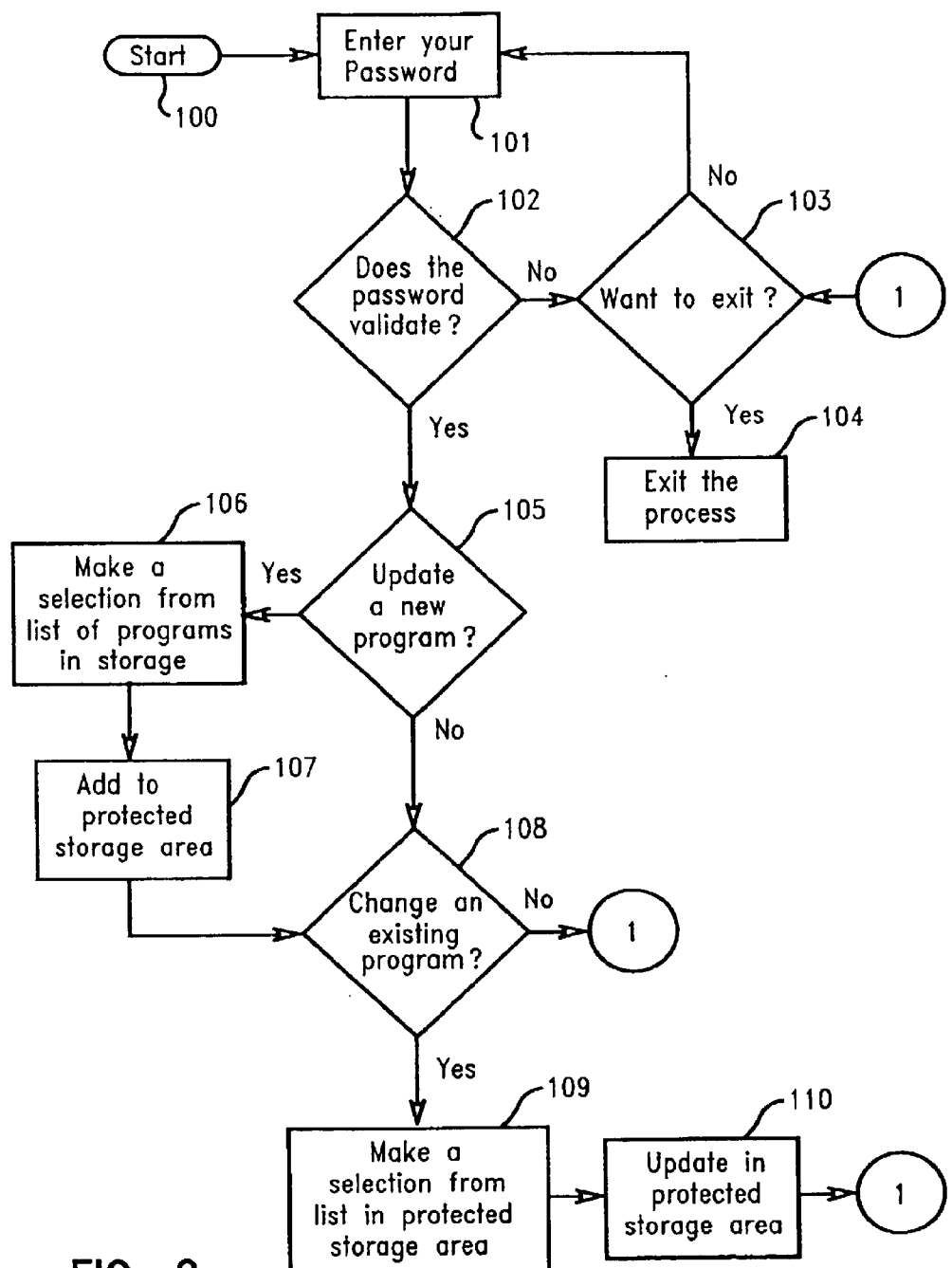
FIG. 2 is a flow diagram illustrating the method steps of making changes to the protected storage area in accordance with the present invention.

FIGS. 2–5 are flow diagrams representing the method steps of the present invention. In FIG. 2, the process of making changes to the protected storage area starts at 100 when a user enters their password 101 in response to a prompt by the PC when access to the protected storage area is detected. The user enters a password and the present invention determines whether the password is valid 102 by matching the entered password with a stored password. If the entered password does not match the stored password, the user may exit the program 103 and terminate the process 104 or enter another password 101. When the user enters a valid password, the user determines whether to update the contents of the protected storage area 105 by adding a new program and non-executable file to the protected storage area. The user then makes a selection 106 from a list of programs and non-executable files stored on the PC and adds the selected program(s) and non-executable file(s) to the protected storage area 107. If the user elects not to update the contents of the protected storage area, the user may determine whether to change an existing program and non-executable file stored in the protected storage area. The user may elect to change an existing program 108 in the protected storage area by selecting one of the programs and non-executable files 109 listed in the protected storage area and updating the program and non-executable file 110, or removing the program and non-executable file from the protected storage area. Updating the files may include adding plug-ins or helper programs to an existing program or updating the program version. If the user elects not to change an existing program, the process may be terminated.

Figure 3:
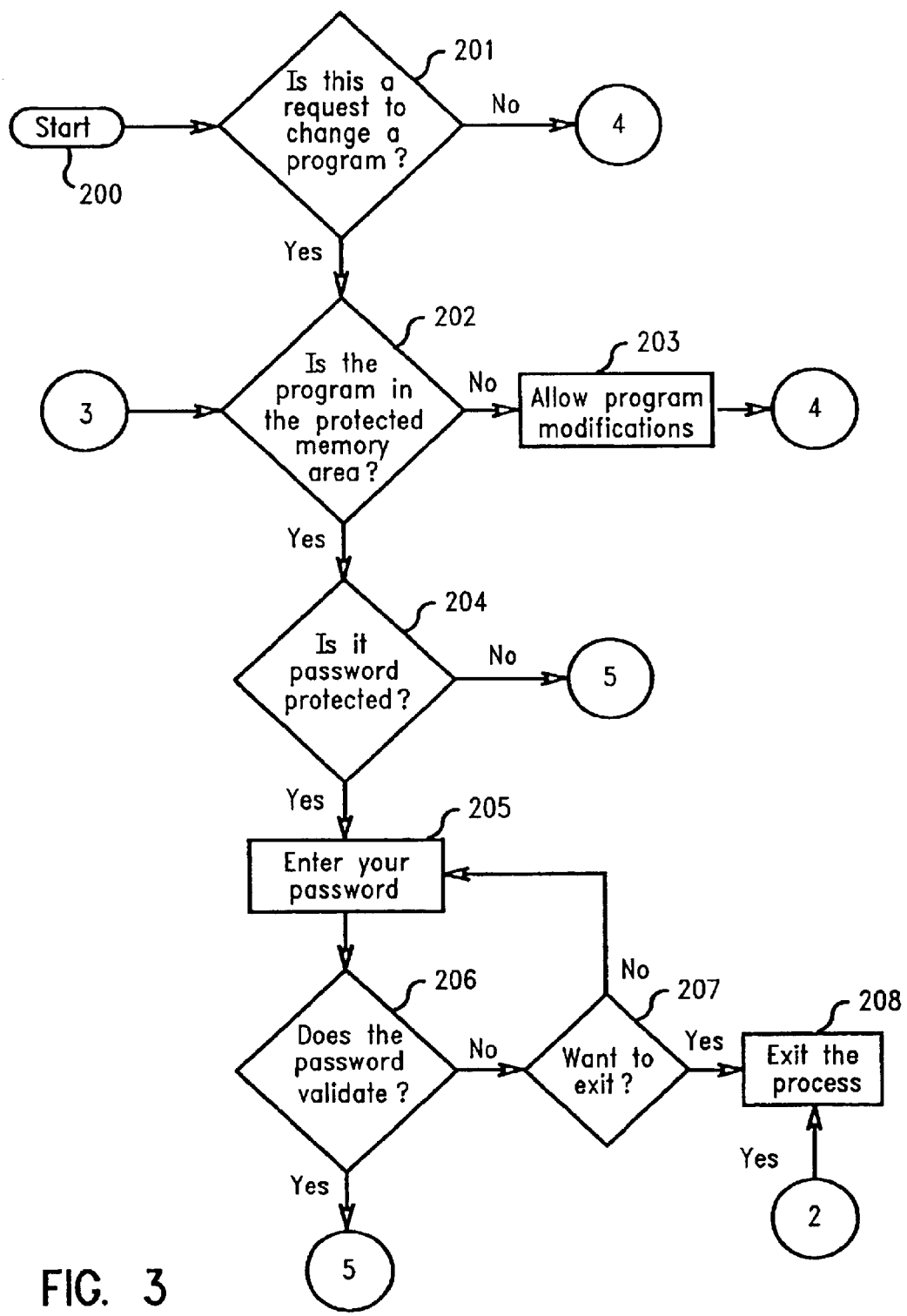
FIG. 3 is a flow diagram illustrating the method steps of making changes to the contents of the protected memory area in accordance with the present invention.
Figure 4:
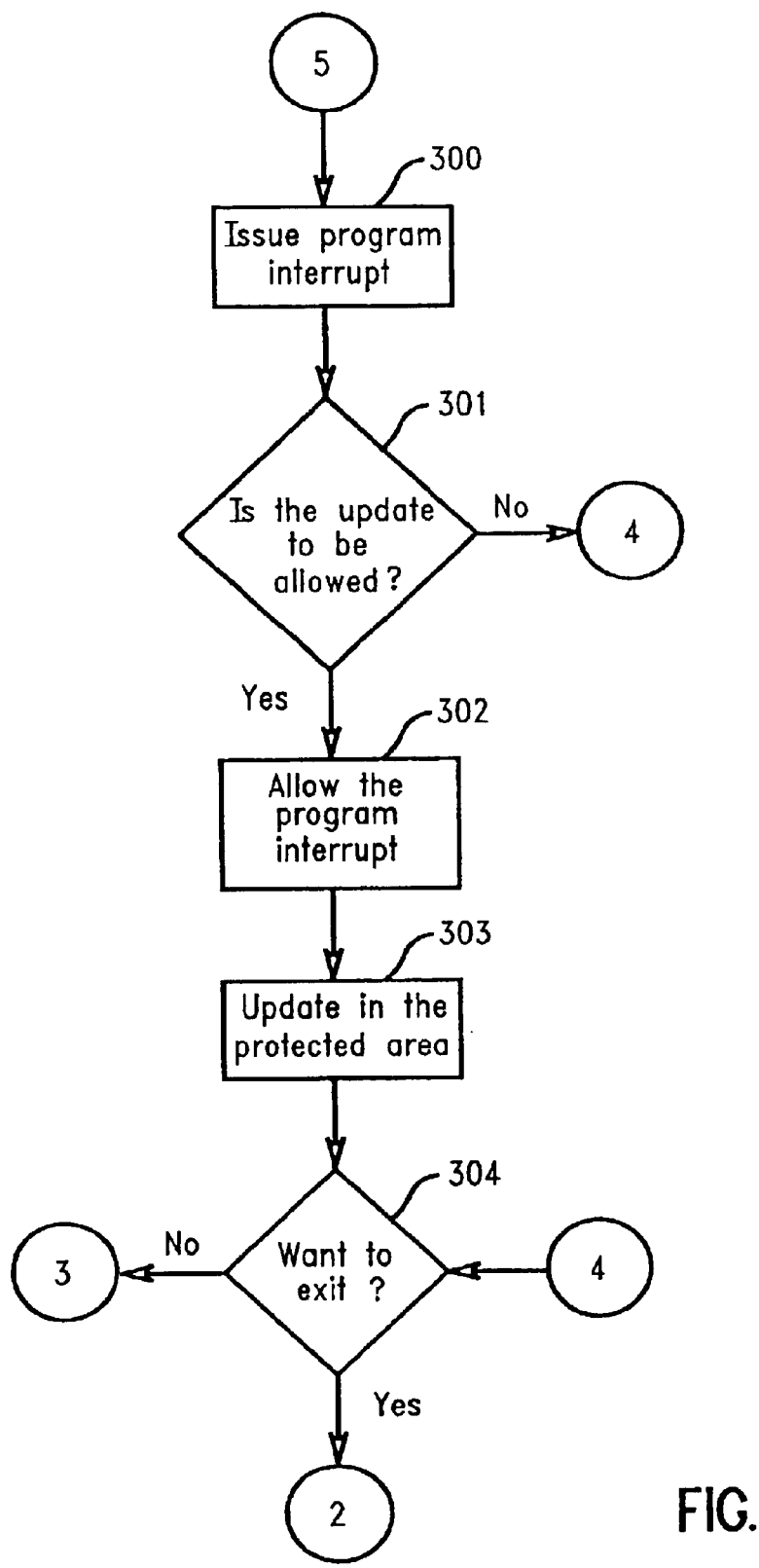
FIG. 4 is a flow diagram illustrating the method steps of alerting a user of a request to modify the protected memory area in accordance with the present invention.

FIG. 3 illustrates the method steps when a user attempts to modify a program and non-executable file from the protected memory area. The process starts at 200 when a request to change a program and non-executable file 201 stored in the PC's internal RAM is detected. If there is no request to change the program and non-executable file, the user may exit the process. However, if a change to the program and non-executable file is requested by the user, it must be determined whether the program and non-executable file is in the protected memory area. If the program or file is not in the protected memory area, program modifications may be freely made 203 to the PC RAM. When the program and non-executable file is located in the protected memory area, the PC determines whether the protected memory area is password protected 204. Even when the protected memory area is not password protected, the present invention will issue a program interrupt 300 (see FIG. 4) to alert the user of the request to modify the protected memory area. In the present invention, the user determines whether the modification will be allowed 301. If the modification is not allowed, the user may decide to exit the process 304. If the modification is allowed, the user responds to the program interrupt 302 and modifies the selected program 303. Once the modification has been made, the user may decide to exit the process 304.

Referring back to FIG. 3, when the protected memory area is password protected, the user must enter their password 205. The password must be validated 206 by checking to see if the entered password matches the stored password. If the password does not match, the process may be terminated 207 and exited 208 or another password may be entered 205. When the user enters a valid password, a program interrupt is issued 300 (see FIG. 4) to alert the user of the request to modify the protected memory area. Again, the present invention then determines whether the modification will be allowed 301. If the modification is not allowed, the user may decide to exit the process at 304. If the modification is allowed, the user responds to the program interrupt 302 and modifies the selected program 303. Once the modification has been made, the user may decide to exit the process 304.

Figure 5:
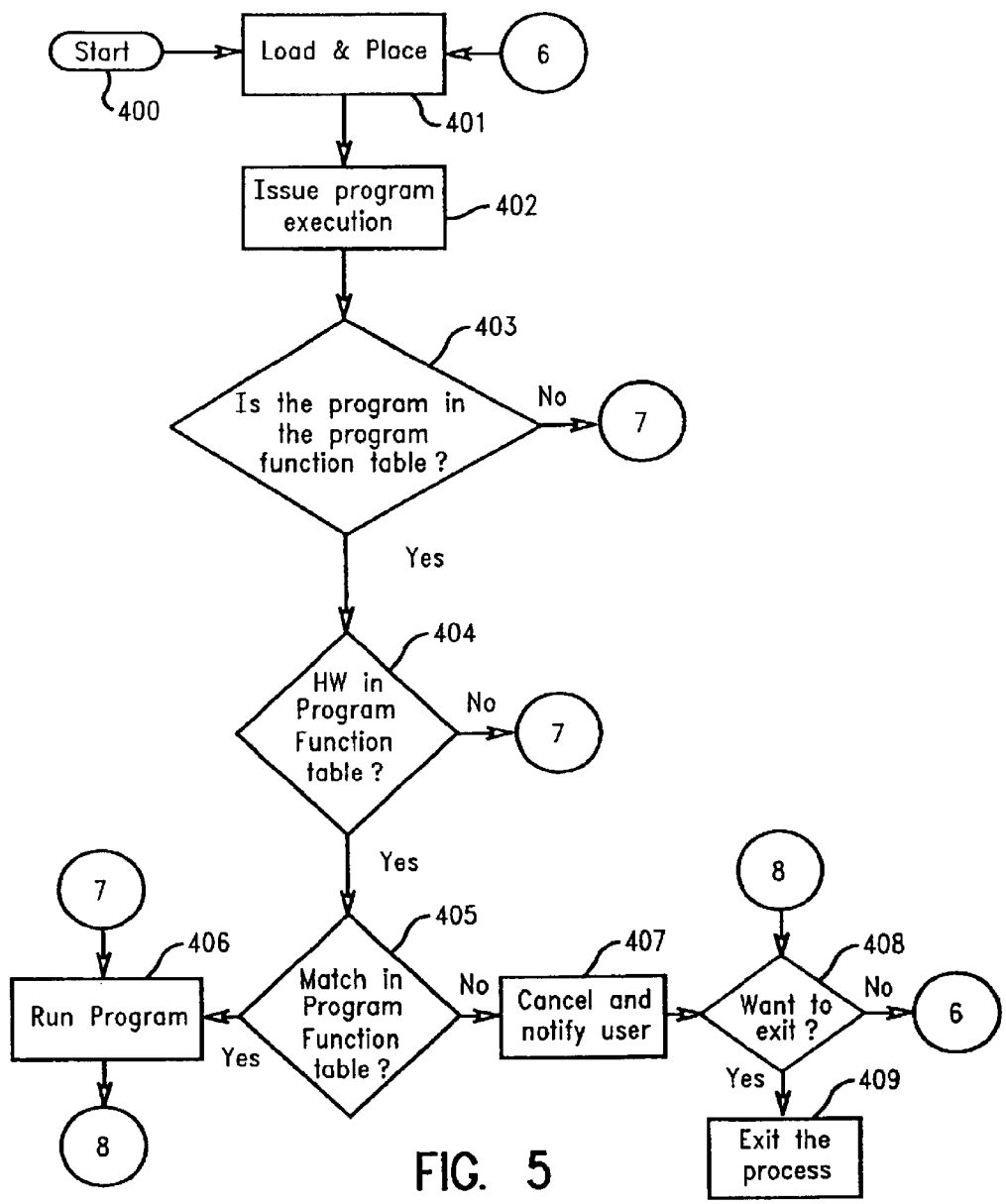
FIG. 5 is a flow diagram illustrating the method steps of loading and executing programs and non-executable files from the protected storage area to the protected memory area in accordance with the present invention.

FIG. 5 illustrates the method steps of loading and executing programs in accordance with the present invention which begins at step 400. A program is loaded 401 from the storage area into the protected memory area of the PC when the user selects and initializes the desired program and non-executable file. An entry was created for the program in the program storage table (see FIG. 2) at the time the program was initially stored on the PC or when the program storage table was updated (see step 106 on FIG. 2). The program storage table entry comprises the program name and the storage location of the program in the protected storage area. Upon initialization of the program, the program begins execution 402. As the program execution begins, the present invention determines whether the program has an entry in the program function table 403. For example, a dialer program for dialing out requires a modem as the hardware. A telephone number would be the instruction written to the modem so that the modem will dial the telephone number. If there is no hardware allocated to the program, program execution continues if possible. If there is hardware allocated to the program, as in the dialer program, the present invention determines whether an entry exists in the program function table (see FIG. 7) for the allocated hardware and the corresponding program 404. The program function table entry preferably comprises the dialer program name, the corresponding hardware, e.g. modem, and the function of the dialer program, e.g. writing a telephone number to the modem for dialing out.

When there is no hardware allocated for the initialized program in the program function table such as a software program, the program will be executed 406. The present invention determines whether an entry for the hardware allocated for the initialized program has a corresponding program listed in the program function table 405. Only when there is a matching entry between the program, the hardware and the function in the program function table will the program continue its execution 406. Otherwise, the program is canceled 407 and the user may decide to exit the process 408 and terminate 409 or begin to load and place another program 401 by selecting the program and beginning the program execution.

The present invention achieves the objects recited above by providing a method and apparatus for controlling the contents and execution of programs and non-executable files, particularly dialer programs, stored in a protected storage area of the PC such that unauthorized access results in a program interrupt and notification to the user. A program storage table of the present invention controls access to programs and non-executable files stored in the protected storage area. Any changes or modifications to the contents of the program storage area require a valid acknowledgement or password or else access is denied and a notification is sent to the user. When a program stored in the protected storage area is initialized, it may be copied into a protected memory area which is also password protected for additional security such that only a user with a valid password may modify the protected memory area. A program function table of the present invention provides the means for monitoring specific I/O operations of the PC permitting selected programs with specific hardware requirements to be executed only if there is an entry for the program. Thus, other programs which are surreptitiously installed on the PC which do not have entries in the program function table will be disabled and a notification sent to the user.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of ensuring that a personal computer is not used to make surreptitious telephone calls to another computer or a telephone, comprising:
   (a) storing a dialer program in a protected storage area on said personal computer, the dialer program being capable of using a modem to access a telephone line to connect the personal computer to another computer or a telephone,
   (b) providing a program storage table;
   (c) creating an entry for said dialer program in said program storage table;
   (d) providing a program function table;
   (e) creating an entry comprising a dialing function for said dialer program in said program function table wherein said personal computer may only use said dialer program to dial; and
   (f) disabling other dialer programs installed on said personal computer outside of said protected storage area having no entries in said program storage table and said program function table.

2. The method of claim 1 wherein step (b) comprises providing a program storage table for monitoring programs stored in said protected storage area.

3. The method of claim 1 wherein step (d) comprises providing a program function table for monitoring functions of programs stored in said protected storage area having entries in said program storage table wherein only those functions entered in said program function table are executable.

4. The method of claim 1 further including the step of requesting an acknowledgement when an attempt to modify said dialer program stored in said protected storage area is detected.

5. The method of claim 4 further including the step of denying access to said dialer program when said acknowledgement is invalid.

6. The method of claim 4 further including the step of providing access to said dialer program when said acknowledgement is valid.

7. The method of claim 1 further including the step of notifying a user of said personal computer when said other dialer programs are installed on said personal computer outside of said protected storage area.

8. The method of claim 1 further including the step of providing a protected memory area wherein said dialer program is copied into said protected memory area from said protected storage area when said dialer program is initialized.

9. A method of ensuring that a personal computer is not used to make surreptitious telephone calls to another computer or a telephone, comprising:
   (a) providing a protected storage area on said personal computer;
   (b) providing a protected memory area on said personal computer;
   (c) storing a dialer program in said protected storage area, the dialer program being capable of using a modem to access a telephone line to connect the personal computer to another computer or a telephone;
   (d) loading said dialer program into said protected memory area when said dialer program is initialized;
   (e) providing a program storage table and creating an entry for said existing dialer program in said program storage table such that access to said existing dialer program is provided only upon receipt of a valid password;
   (f) providing a program function table and creating an entry for said existing dialer program in said program function table such that only those functions listed in said program function table are executable by said personal computer;
   (g) preventing access to said program storage table, said program function table and said existing dialer program without receipt of a valid password; and
   (h) disabling an other dialer program when said other dialer program is installed, and initialized on said personal computer.

10. A method of creating and utilizing a program storage table on a personal computer comprising the steps of:
   (a) providing a protected storage area on said personal computer;
   (b) installing a dialer program in said protected storage area, the dialer program being capable of using a modem to access a telephone line to connect the personal computer to another computer or a telephone;
   (c) creating a program storage table comprising an entry for said dialer program stored in said protected storage area;
   (d) requesting a password when a modification to said dialer program in said protected storage area having an entry in said program storage table is detected;
   (e) preventing modification of said dialer program in said protected storage area having an entry in said program storage table when said password is invalid; and
   (f) allowing modification of said dialer program in said protected storage area having an entry in said program storage table when a valid password is received.

11. A method of creating and utilizing a program function table on a personal computer comprising the steps of:
   (a) providing a protected storage area on said personal computer;
   (b) installing a dialer program in said protected storage area, the dialer program being capable of using a modem to access a telephone line to connect the personal computer to another computer or a telephone;
   (c) creating a program function table comprising entries for said dialer program stored in said protected storage area, each entry comprising a function of said dialer program stored in said protected storage area;
   (d) creating an entry for said dialer program installed in said protected storage area in said program function table, said entry comprising a dialer function;
   (e) determining whether an entry exists in said program function table when a dialer program is initialized;
   (f) disabling said initialized dialer program when said initialized dialer program has no entry in said program function table; and
   (g) executing said initialized dialer program when said initialized dialer program has an entry in said program function table.

12. The method of claim 11 wherein during step (g) executable files of said initialized program is copied from said protected storage area to a random access memory of said personal computer.

13. A program storage device readable by a machine, tangibly embodying a program of instructions executable by the machine to perform method steps for ensuring that a personal computer is not used to make surreptitious telephone calls to another computer or a telephone, said method comprising:
   (a) storing a dialer program in a protected storage area, the dialer program being capable of using a modem to access a telephone line to connect the personal computer to another computer or a telephone;
   (b) providing a program storage table;
   (c) creating an entry for said dialer program in said program storage table;
   (d) providing a program function table;
   (e) creating an entry for said dialer program in said program function table wherein only said dialer program may be utilized by the personal computer to dial; and
   (f) disabling other dialer programs not installed in said protected storage area having no entries in said program storage table and said program function table.

14. A computer program product comprising
   a computer usable medium having computer readable program code means embodied therein for protecting a dialer program from unauthorized access, the dialer program being capable of using a modem to access a telephone line to connect the personal computer to another computer or a telephone, said computer program product having:
      computer readable program code means for causing a computer to create a protected storage area;
      computer readable program code means for causing said computer to create a protected memory area;
      computer readable program code means for causing said computer to store said dialer program in said protected storage area;
      computer readable code means for causing said computer to load said dialer program into said protected memory area when said dialer program is initialized; and
      computer readably program code means for causing said computer to prevent modifications to said dialer program when unauthorized access to said dialer program is detected.

15. A computer program product comprising
   a computer usable medium having computer readable program code means embodied therein for controlling a dialer program, the dialer program being capable of using a modem to access a telephone line to connect the personal computer to another computer or a telephone, said computer program product having:
      computer readable program code means for causing a computer to create a protected storage area;
      computer readable program code means for causing said computer to store said dialer program in said protected storage area;
      computer readable program code means for causing said computer to create a protected memory area;
      computer readable code means for causing said computer to load said dialer program into said protected memory area when said dialer program is initialized;
      computer readable program code means for causing said computer to request an acknowledgement when a modification to said dialer program is initiated; and
      computer readable program code means for causing said computer to prevent access to said dialer program when said acknowledgement is invalid.

16. A computer program product comprising
   a computer usable medium having computer readable program code means embodied therein for protecting a dialer program from unauthorized access, the dialer program being capable of using a modem to access a telephone line to connect the personal computer to another computer or a telephone, said computer program product having:
      computer readable program code means for causing a computer to create a protected storage area for storing said dialer program;
      computer readable program code means for causing said computer to create a protected memory area wherein upon initialization of said dialer program, said dialer program is loaded into said protected memory area;
      computer readable program code means for causing said computer to create a program storage table;
      computer readable program code means for causing said computer to create an entry for said dialer program in said program storage table;
      computer readable program code means for causing said computer to detect any attempts to modify said dialer program;
      computer readable program code means for causing said computer to determine whether said dialer program has an entry in said program storage table when an attempt to modify said dialer program in detected;
      computer readable program code means for causing said computer to request an acknowledgement; computer readable program code means for causing said computer to prevent modification of said dialer program when an invalid acknowledgement is received; and
      computer readable program code means for causing said computer to allow modification of said dialer program when a valid acknowledgement is received.

17. A computer program product comprising:
   a computer usable medium having computer readable program code means embodied therein for ensuring that a personal computer is not used to make surreptitious telephone calls to another computer or a telephone, said computer program product having:
      computer readable program code means for causing a computer to store a dialer program in a protected storage area, the dialer program being capable of using a modem to access a telephone line to connect the personal computer to another computer or a telephone;
      computer readable program code means for causing said computer to copy said dialer program into a protected memory area from said protected storage area;
      computer readable program code means for causing said computer to provide a program storage table;
      computer readable program code means for causing said computer to create an entry for said dialer program in said program storage table;
      computer readable program code means for causing said computer to provide a program function table;
      computer readable program code means for causing said computer to create an entry comprising a dialer function for said dialer program wherein only said dialer program may be used to dial; and computer readable program code means for causing said computer to disable other dialer programs not found in said protected storage area and said protected memory area without entries in said program storage table and said program function table.

18. A computer program product comprising:

a computer usable medium having computer readable program code means embodied therein for preventing a dialer program from being installed on a personal computer having an existing dialer program, the existing dialer program using a modem to access a telephone line to connect the personal computer to another computer or a telephone, said computer program product having:

computer readable program code means for causing a computer to provide a protected storage area;

computer readable program code means for causing said computer to store said existing dialer program in said protected storage area;

computer readable program code means for causing said computer to provide a program storage table and create an entry for said existing dialer program in said program storage table such that access to said existing dialer program is provided only upon receipt of a valid password;

computer readable program code means for causing said computer to provide a program function table and create an entry for said existing dialer program in said program function table such that only those functions listed in said program function table are executable;

computer readable program code means for causing said computer to prevent access to said program storage table, said program function table and said existing dialer program without receipt of a valid password; and computer readable program code means for causing said computer to disable an other dialer program when said other dialer program is installed and initialized on said personal computer.

* * * * *